(12) United States Patent
Visvanathan et al.

(10) Patent No.: US 9,679,218 B2
(45) Date of Patent: Jun. 13, 2017

(54) METHOD AND APPARATUS FOR IMAGE MATCHING

(71) Applicant: Tata Consultancy Services Limited, Mumbai (IN)

(72) Inventors: Aishwarya Visvanathan, Bangalore (IN); Tanushyam Chattopadhyay, Kolkata (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 14/889,946

(22) PCT Filed: Apr. 25, 2014

(86) PCT No.: PCT/IN2014/000272
§ 371 (c)(1),
(2) Date: Nov. 9, 2015

(87) PCT Pub. No.: WO2014/188446
PCT Pub. Date: Nov. 27, 2014

(65) Prior Publication Data
US 2016/0125253 A1    May 5, 2016

(30) Foreign Application Priority Data
May 9, 2013   (IN) .......................... 1680/MUM/2013

(51) Int. Cl.
*G06K 9/00*   (2006.01)
*G06K 9/32*   (2006.01)
(Continued)

(52) U.S. Cl.
CPC ............. *G06K 9/3258* (2013.01); *G06K 9/40* (2013.01); *G06K 9/4671* (2013.01);
(Continued)

(58) Field of Classification Search
CPC ...... G06K 9/3258; G06K 9/40; G06K 9/6202; G06K 9/6211; G06K 2209/01; G06K 2209/15
(Continued)

(56) References Cited

U.S. PATENT DOCUMENTS 6,640,008 B1   10/2003   Lee et al.
7,305,106 B2 *  12/2007   Sumitomo ............... G06K 9/48
                                                    382/103
(Continued)

FOREIGN PATENT DOCUMENTS

WO    2010100485 A1   9/2010

OTHER PUBLICATIONS

Lin Wang et al. "Application of Gaussian-Hermite Moments in License"; Guizhou University for Nationalities China, 2011.
(Continued)

*Primary Examiner* — Mekonen Bekele
(74) *Attorney, Agent, or Firm* — Finnegan, Henderson, Farabow, Garrett & Dunner, L.L.P.

(57) ABSTRACT

Disclosed is a method and apparatus for computation and processing of an image for image matching. The apparatus here is configured to pre-process plurality of images for creating an image template. Next, the test image is extracted and pre-processed for assessing the degree of match between the test image components and the image components of the images in the image template, based a position based matching score, a feature based matching score or both.

13 Claims, 13 Drawing Sheets

(51) Int. Cl.
*G06K 9/62* (2006.01)
*G06K 9/40* (2006.01)
*G06K 9/46* (2006.01)

(52) U.S. Cl.
CPC .......... *G06K 9/6202* (2013.01); *G06K 9/6211* (2013.01); *G06K 2209/01* (2013.01); *G06K 2209/15* (2013.01)

(58) Field of Classification Search
USPC ....... 382/195, 190, 218, 124, 254, 103, 115, 382/209
See application file for complete search history.

(56) References Cited

U.S. PATENT DOCUMENTS

| | | | |
|---|---|---|---|
| 7,512,275 B2* | 3/2009 | Yumoto | G06K 9/00087 382/224 |
| 7,965,887 B2 | 6/2011 | Wallack et al. | |
| 8,391,602 B2 | 3/2013 | Chaki et al. | |
| 8,929,597 B2* | 1/2015 | Huang | G06T 7/246 382/103 |
| 2004/0165750 A1 | 8/2004 | Chew et al. | |
| 2005/0084155 A1* | 4/2005 | Yumoto | G06K 9/6202 382/190 |
| 2005/0105770 A1* | 5/2005 | Sumitomo | G06K 9/48 382/103 |
| 2006/0147105 A1* | 7/2006 | Lee | G06K 9/6204 382/151 |
| 2006/0210170 A1* | 9/2006 | Yumoto | G06K 9/0008 382/219 |
| 2007/0292029 A1 | 12/2007 | Wang et al. | |
| 2010/0070435 A1* | 3/2010 | Candela | G06N 99/005 706/12 |
| 2011/0158542 A1* | 6/2011 | Kato | G06K 9/00281 382/195 |

OTHER PUBLICATIONS

Krzysztof Malczewski et. al. "Double Back-Projection License Plate Recognition Framework"; Department of Electronics and Telecommunications Poznan University of Technology, Poland, 2010.

Jian Liang et. al. "Camera-based analysis of text and documents: a survey"; Language and Media Processing Laboratory, Institute for Advanced Computer Studies, University of Maryland, College Park, USA; 2005.

Ardhendu Behera et. al. "Visual Signature based Identification of Low-resolution Document Images"; Université de Fribourg; Jan. 2004.

Cristian Molder et.al. "Decision Fusion for Improved Automatic License Plate Recognition" WSEAS Transactions on Information Science and Applications; Issue 2, vol. 6, Feb. 2009.

International Search Report mailed by the International Searching Authority on Aug. 25, 2015 in International Application No. PCT/IN2014/000272 (2 pages).

* cited by examiner

METHOD AND APPARATUS FOR IMAGE MATCHING

TECHNICAL FIELD

The present subject matter described herein, in general, relates to an image matching, and more particularly to the image matching apparatus and the related method for computation and processing of an image.

BACKGROUND

Image recognition makes it possible to detect what is present on a photograph or a picture. The photograph or a picture may include a text, a number or any animation and the like. Traditionally, there are various image-matching techniques for image recognition, which includes, though not limited to shape matching, object matching, and pattern matching.

Conventionally, an optical character recognition (OCR) technique is used for recognizing the texts within an Image-, the image recognition and pattern matching in many applications like number plate recognition. Apart from various advantages there are some major disadvantages in the technique. One of the major disadvantages with the technique is that it does not work efficiently due to a variation in the painting style of a number plate. To incorporate all variations in painting style, there is a need to learn the OCR system with all possible fonts/painting style of the characters. Further, there are no standard fonts and size of the number plates, which can impose a restriction on the OCR technique. Moreover, there are different painting agents/agencies who write the numbers on the plates with different and unique styles that make it very difficult for the OCR technique to recognize the exact image.

There are various other some commercially available applications like Google Goggles that recognizes images and text captured by a device like mobile or cameras. Additionally, there are various limitations and challenges for the applications including the need of the application to require the Internet Connection continuously. Further, it is required to extract individual characters on embedded mobile platform which has constraints with respect to both memory and processor. Furthermore, the presence of specular reflection makes the recognition task more difficult; images captured are mostly in the night, so the images obtained are often blurred and have low contrast and text localization against the background of the image captured.

SUMMARY

This summary is provided to introduce aspects related to apparatus and methods for computation and processing of an image for image matching and the aspects are further described below in the detailed description. This summary is not intended to identify essential features of the claimed subject matter nor is it intended for use in determining or limiting the scope of the claimed subject matter.

In one implementation, an image matching apparatus for computation and processing of an image for image matching is disclosed. The image matching apparatus comprises a processor and a memory coupled to the processor for executing a plurality of modules present in the memory. The plurality of modules comprises a receiving module, a template creation module and a matching module. The receiving module is configured to receive at least one pre-processed test image wherein said pre-processed test image comprises of one or more test image components along with one or more features associated with the image components, from the capturing device. The receiving module is further configured to receive a plurality of pre-processed images for creating an image template. Next, the template creation module is configured to create at least one image template from the plurality of pre-processed images received by the receiving module. The matching module then computes a position based matching score or a feature based matching score or both, based on the test image component and the image components of the plurality of pre-processed images of the image template.

In addition, the capturing device of the apparatus comprises a capturing module and a pre-processing module. The capturing module is configured to capture one or more images. The pre-processing module then extracts one or more image components along with one or more features associated with the image components.

In one implementation, a method for image matching for computation and processing of an image for image matching is disclosed. The method for image matching comprises of receiving a plurality of pre-processed images. The received pre-processed images are utilized for deriving at least one image template. The method for image matching further comprises of receiving at least a pre-processed test image wherein said pre-processed test image comprises one or more image components along with one or more features associated with the image components. A matching process is employed to determine a matching degree between the test image component received and the image components of the plurality of pre-processed images of the image template. The matching process further comprises of computing a position based matching score, a feature based matching score or both. Based on the at least one of the position based matching score, the feature based matching score or a combination thereof, the matching degree is determined. The matching degree is further compared with a predetermined threshold degree to evaluate similarity between the test image components and the image components of the image template.

In one aspect of the invention, the matching degree is determined optimally as a function of both position based matching score and the feature based matching score.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
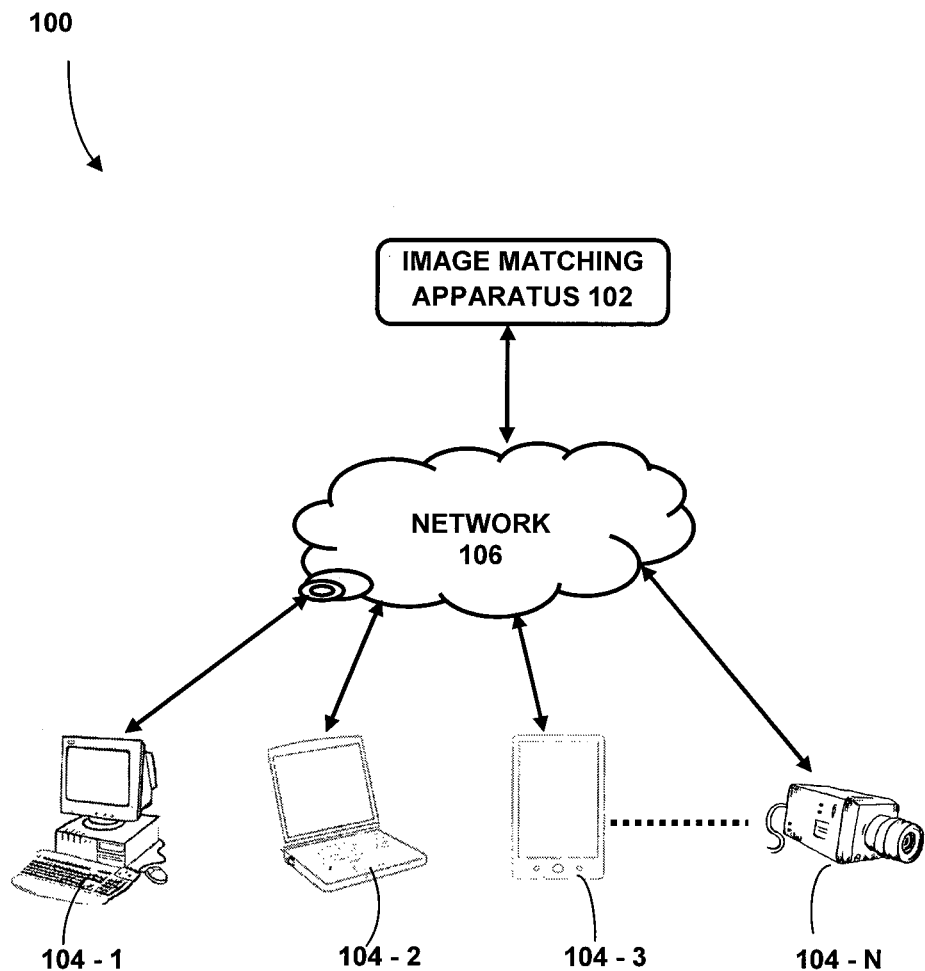
FIG. 1 illustrates a network implementation of an image matching apparatus, in accordance with an embodiment of the present subject matter.

Systems and methods for image matching apparatus for computation and processing of an image for image matching are described.

In one example, the present subject matter discloses a capturing device based sensing to automate image recognition and improve recognition accuracy based on template matching.

In one implementation, the present subject matter discloses an image matching apparatus. The image matching apparatus comprises of a processor and a memory coupled to the processor for executing a plurality of modules present in the memory. The plurality of modules comprises a receiving module, a template creation module and a matching module. The receiving module is configured to receive at least one pre-processed test image wherein said pre-processed test image comprises of one or more test image components along with one or more features associated with the image components, from the capturing device. The receiving module is further configured to receive a plurality of pre-processed images for creating an image template. Next, the template creation module is configured to create at least one image template from the plurality of pre-processed images received by the receiving module. The matching module then computes a position based matching score or a feature based matching score or both, based on the test image component and the image components of the plurality of pre-processed images of the image template. In an exemplary embodiment, the matching degree is determined optimally as a function of both the position based matching score and the feature based matching score.

In addition, the capturing device of the image matching apparatus comprises a capturing module and a pre-processing module. While the capturing module is configured to capture one or more images, the pre-processing module extracts one or more image components along with one or more features associated with the image components.

In one implementation, the image matching apparatus is configured to receive a test image from the capturing device. Further the capturing device is configured receive a plurality of pre-processed images for creating an image template. The image received by the apparatus may be in the pre-processed form. The pre-processed image comprises of one or more test image components along with one or more features associated with the image components. The capturing device comprises a capturing module configured to capture one or more image, and a pre-processing module that is configured to extract one or more image components along with one or more features associated with the image components. In one example, the extracted features comprises of vertical projection, horizontal projection, contour and a stroke direction from the image and the like.

The image template is created based on the plurality of pre-processed images. The template created comprises of the plurality of pre-processed images, the image components thereof along with one or more features associated with the image components.

The matching module in the apparatus is configured to compute a position based matching score a feature based matching score or a combination thereof, between the test image component and the image components of the plurality of pre-processed images of the image template. In one preferred embodiment, the matching degree is determined optimally as a function of both the position based matching score and the feature based matching score.

While aspects of described apparatus and method for image matching apparatus computation and processing of an image for image matching may be implemented in any number of different computing apparatus, environments, and/or configurations, the embodiments are described in the context of the following exemplary apparatus.

Referring now to FIG. 1, a network implementation 100 of an image matching apparatus 102 for computation and processing of an image for image matching is illustrated, in accordance with an embodiment of the present subject matter. In one embodiment, the image matching apparatus 102 is configured to receive at least a pre-processed test image from capturing device. The pre-processed test image comprises of one or more test image components along with one or more features associated with the image components. The receiving module is further configured to receive a plurality of pre-processed images for creating an image template. The template creation module of the image matching apparatus 102 is configured to create at least one image template from the plurality of pre-processed images. The matching module of image matching apparatus 102 computes a position based matching score, a feature based matching score or a combination thereof, between the test image component and the image components of the plurality of pre-processed images of the image template.

Although the present subject matter is explained considering that the an image matching apparatus 102 is implemented as a apparatus on a server, it may be understood that the image matching apparatus 102 may also be implemented in a variety of computing apparatuses, such as a laptop computer, a desktop computer, a notebook, a workstation, a mainframe computer, a server, a network server, and the like. It will be understood that the matching apparatus 102 may be accessed by multiple users through one or more user devices 104-1, 104-2 . . . 104-N, collectively referred to as capturing device 104 hereinafter, or applications residing on the capturing device 104. Examples of the capturing device 104 may include, but are not limited to, a portable computer, a personal digital assistant, a handheld device, and a workstation. The capturing devices 104 are communicatively coupled to the image matching apparatus 102 through a network 106.

The capturing device comprises a capturing module and a pre-processing module. The capturing module is configured to capture one or more images, while the pre-processing module is configured to extract one or more image components along with one or more features associated with the image components. The capturing device further transmits the one or more image components so extracted along with one or more features associated with the image components to the receiving module of the image matching apparatus 102.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
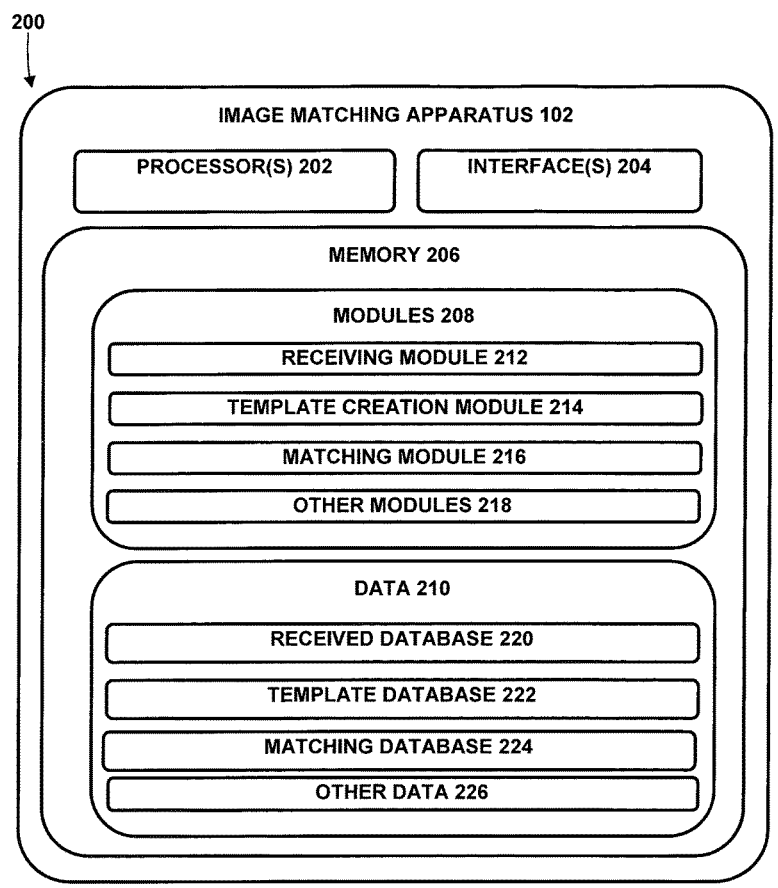
FIG. 2 illustrates the image matching apparatus, in accordance with an embodiment of the present subject matter.

Referring now to FIG. 2, the image matching apparatus 102 is illustrated in accordance with an embodiment of the present subject matter. In one embodiment, the image matching apparatus 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the image matching apparatus 102 to interact with a user directly or through the client devices 104. Further, the I/O interface 204 may enable image matching apparatus 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, a template creation module 214, a matching module 216, and other modules 218. The other modules 218 may include programs or coded instructions that supplement applications and functions of image matching apparatus 102.

The data 210, amongst other things, serves as a repository for storing data processed, received, and generated by one or more of the modules 208. The data 210 may also include a received database 220, a template database 222, a matching database 224, and other data 226. The other data 226 may include data generated because of the execution of one or more modules in the other module 218.

Figure 3:
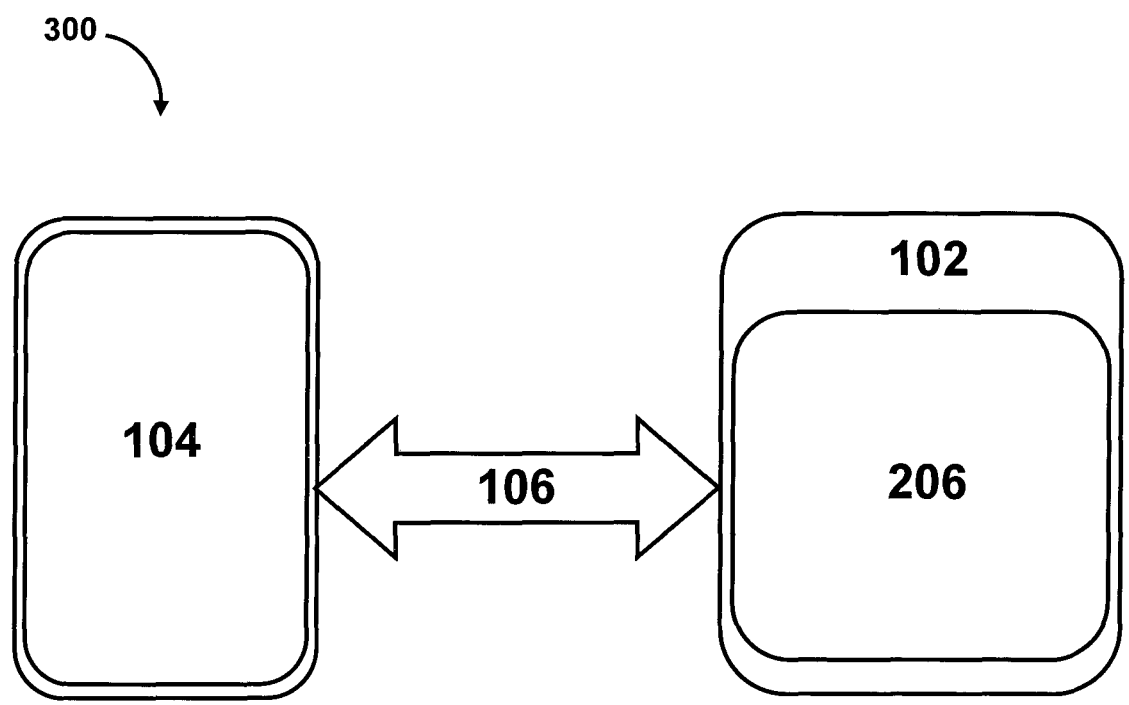
FIG. 3 illustrates a block diagram of the image matching apparatus, in accordance with an embodiment of the present subject matter.

The overall working of the apparatus is explained in FIG. 3. Referring to FIG. 3, a block diagram 300 of the image matching apparatus 102 is shown, in accordance with an embodiment of the present subject matter.

In one implementation, at first, a user may use the capturing device 104 to capture one or more test image. In one example, the capturing device 104 may be any device capable of capturing a test image using camera and the like. In one example, the test image captured is further pre-processed at the capturing device 104 end. The capturing device 104 further transmits one or more test image components along with one or more features associated with the image components, to the memory 206 present in the image matching apparatus 102 through the network 106.

Figure 4:
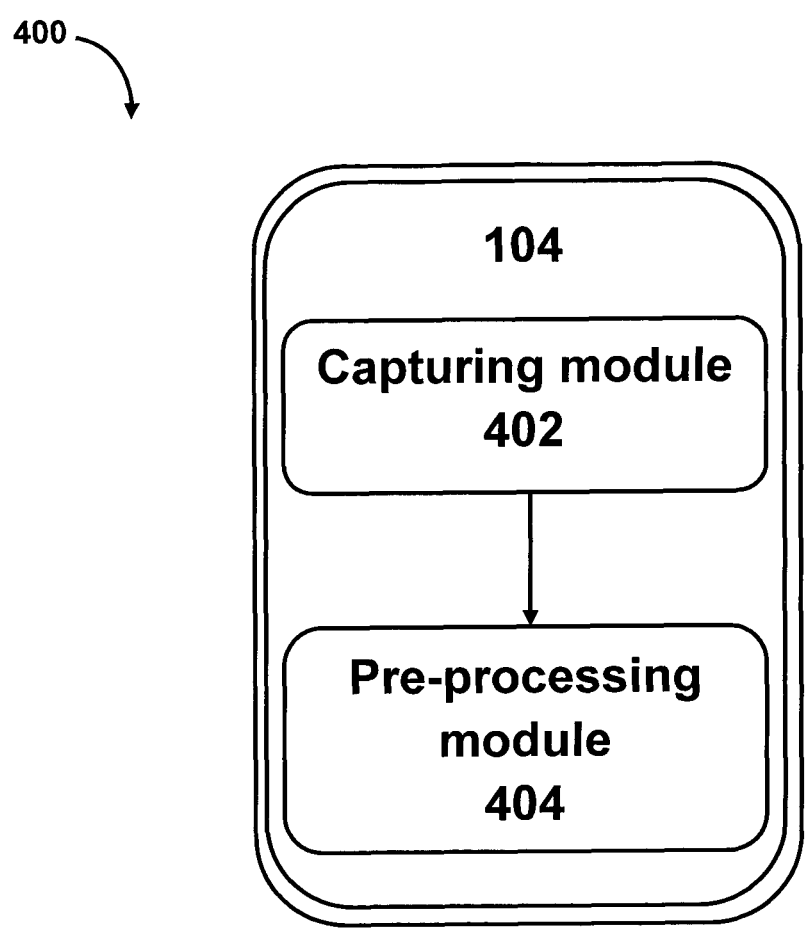
FIG. 4 illustrates a block diagram of pre-processing at capturing device, in accordance with an embodiment of the present subject matter
Figure 5:
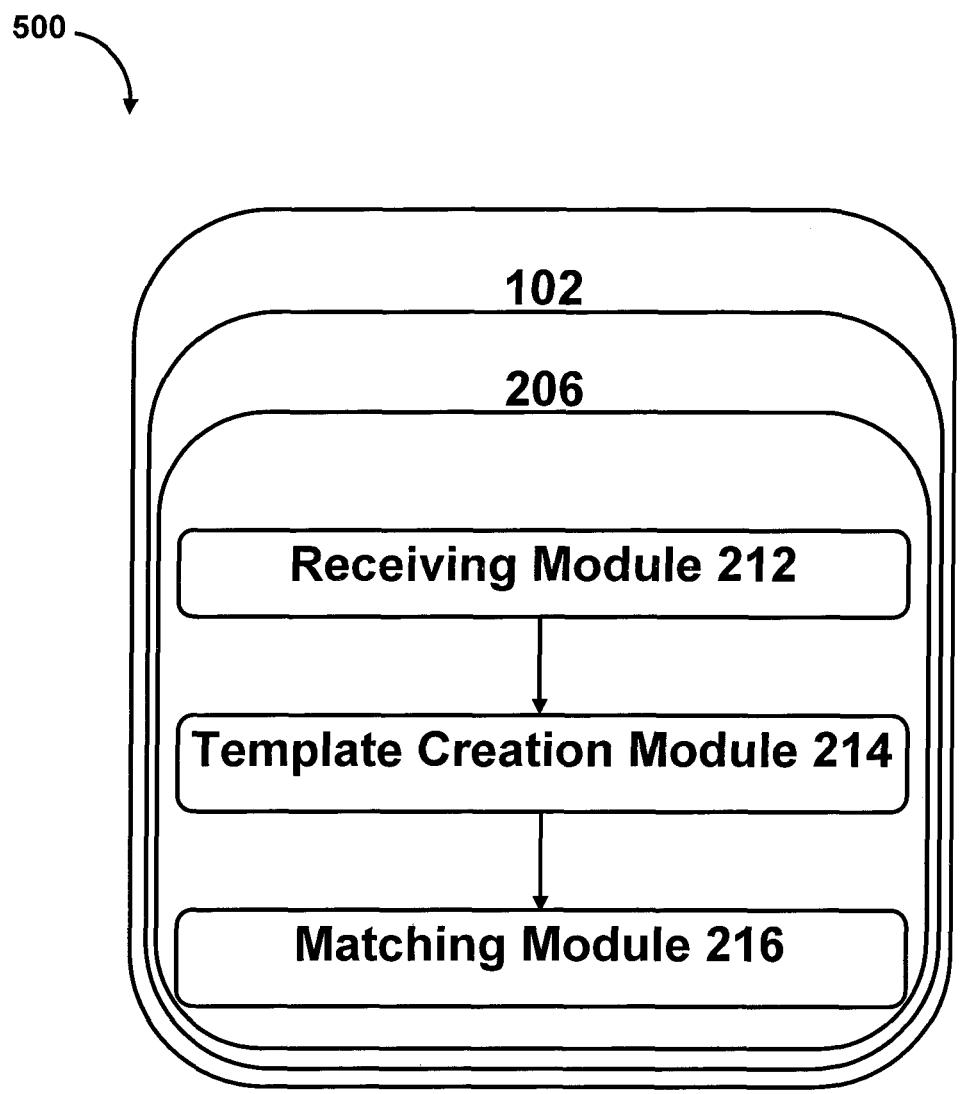
FIG. 5 illustrates a block diagram of processing at the backend server of the image matching apparatus, in accordance with an embodiment of the present subject matter

The detailed description of the overall process in the capturing device 104, and in the memory 206 is explained in the FIG. 4 and FIG. 5, respectively.

Referring to FIG. 4 a block diagram 400 of pre-processing at capturing device is illustrated, in accordance with an embodiment of the present subject matter The capturing device 104 further comprises of a capturing module 402 to capture one or more test image, and a pre-processing module 404 to extract one or more image components along with one or more features associated with the image components. Further, the capturing device 104 is adapted for transmitting one or more image components along with one or more features associated with the image components, to the memory 206. In one example, the capturing device 104 may transmit at least one pre-processed test image wherein the said pre-processed test image comprises of one or more image components along with one or more features associated with the image components.

In one example, the one or more image captured may be in a file format including but not limited to a jpeg, an mpeg, a png and the like. Further, the images captured may include but not limited to a character, a number, an image and the like.

In one example, the capturing module 402 is adapted to capture atleast one image, which further transmits the captured image to the pre-processing module 404. The pre-processing module 404 is further adapted to generate a pre-processed image. The pre-processed image is obtained by performing the steps including: binarizing the image, de-skewing the binarized image, noise cleaning the de-skewed image, size normalizing the noise cleaned image and extracting the plurality of features from the size normalized image.

In one example, the binarizing the image may be performed by using an Otsu's method, Savoula method, Niblack method, Wolf Binarization Techniques and the like, and preferably Otsu's method because of its low complexity yet robustness.

In one example, de-skewing the binarized image is performed preferably by Hough transform method. However, the disclosed subject matter shall be understood to include other methods of image de-skewing that may be well known to the person skilled in the art.

In one example, noise cleaning of the de-skewed image is performed to remove small characters, thus extracting only significant components by the methods well known to the person practicing and skilled in the art.

In one example, size normalization of the noise cleaned image is performed in order to make the characters independent of size and camera zoom.

In one example, the plurality of features from the size normalized image is extracted using any of the existing feature extraction techniques known in the art. The plurality of features extracted may include but not limited to a vertical projection, a horizontal projection, where the number of black pixels in each direction are extracted, and stroke features are extracted, which gives the direction of the stroke. The plurality of features extracted is transmitted to the memory 206 for further processing as explained below.

Referring now to FIG. 5 a block diagram 500 of processing at a backend server of the image matching apparatus is shown, in accordance with an embodiment of the present subject matter.

The plurality of extracted features is transmitted by the capturing device 104 to the memory 206 present in the matching apparatus 102, for further processing. The memory 206 comprises of a plurality of modules including, a receiving module 212, a template creation module 214 and a matching module 216. The receiving module 212 is adapted to receive plurality of pre-processed images for creating an image template. The template creation module 214 is adapted to create at least one image template from the plurality of pre-processed images. The matching module 216 is adapted to compute a position based matching score and a feature based matching score or a combination thereof.

In one example, the receiving module 212 is adapted for receiving at least one pre-processed test image, said pre-processed test image comprising one or more test image components along with one or more features associated with the image components, from the capturing device 104.

In another example, the plurality of pre-processed images for creating an image template are received after the pre-processing, wherein the pre-processing is achieved in steps of binarization of the image, de-skewing of the binarized image, noise cleaning of the de-skewed image, size normalizing of the noise cleaned image and extraction of the plurality of features from the size normalized image. The pre-processing may be performed in the same way as explained in FIG. 4.

In one implementation, the data received by the receiving module 212 is stored in a receiving database 222, for further processing. The data stored in the received database 220 may include but not limited to test image components along with one or more features associated with the image components and pre-processed images for creating an image template.

In one example, the template creation module 214 may be adapted to create at least one image template from the plurality of pre-processed images. The image template may comprise of the plurality of pre-processed images, the image components thereof along with one or more features associated with the image components, obtained from the pre-processing steps, as mentioned above. The exemplary image template is however shown, and discussed in detail in FIG. 11.

In one implementation, the data related to the template creation module 214 is stored in the template database 220, for further processing. In one example, the data stored in the template database 222 may include a vehicle car number plate image, a number of lines of text in the vehicle car number plate image, the number plate extracted from the pre-processing method, a component number extracted from the vehicle car number plate image the pre-processing method, and a plurality of feature details. These feature details may include component boundary details, vertical projection, horizontal projection, contour and a stroke direction and vertical, horizontal and stroke projection extracted from the pre-processing method. The number of lines of text, the component number and the plurality of features may be extracted from the vehicle car number plate image during the pre-processing of the vehicle car number plate image.

In one example, the matching module 216 is adapted to compute the position based matching score and the feature based matching score or a combination thereof.

The position based matching score is derived using the steps of:

a) defining boundary co-ordinates of the image component associated with the pre-processed test image and the plurality of pre-processed images of the image template, b) computing relative co-ordinates of the image components associated with the pre-processed test image and the plurality of pre-processed images of the image template, c) computing similar relative co-ordinates to make the image components resolution independent and d) deriving the position based matching score based on matching of the similar relative coordinates of the image components associated with the first pre-processed image and the plurality of pre-processed images of the image template.

In one example, the boundary co-ordinates of the image component are defined using the following steps: firstly, the noise cleaned binary image so received is analyzed using a connected component analysis. The top left coordinates ($x_i$; $y_i$), height (h) and width (w) of each $i^{th}$ component is determined, where i∈(1, 2 . . . n) and n is the number of components in the image. The bounding box (BB) of the entire text region inside the image received is found and the co-ordinates for the box are assigned. For example, let the top left coordinate of that BB be (X; Y), height be H and the width be W.

In one example, the relative co-ordinates of the image components associated with the pre-processed test image and the plurality of pre-processed images of the image template are computed. For example, the relative coordinate (x'; y') of the component with respect to the image can be computed using the equations defined below:

$$x' = \frac{X - x'}{W - w} \qquad (1)$$

$$y' = \frac{Y - y'}{H - h} \qquad (2)$$

In one example, similar relative co-ordinates for the image components are computed in order to make them resolution independent. For example, the similar relative coordinates for both the template and the test images as ($x_T'$, $y_T'$) and ($x_t'$, $y_t'$) may be computed. Now, since each such (x'; y') resides in the range (0, 1) it is representative of the relative x and y coordinate with respect to the entire image.

In one example, the position based matching score based on matching of the similar relative coordinates of the image components associated with the first pre-processed image and the plurality of pre-processed images of the image template is derived. For example, the position based matching score ($s_{loc}$) between the test component and each of the $i^{th}$ component from the template component set can be computed from the equation given below:

$$d_{loc}(t,\tau_i)=(|x'_{\tau_i}-x'_t|)\cdot(|y'_{\tau_i}-y'_t|) \quad (3)$$

In one example, the $s_{loc}$ also resides in the range (0, 1). The best match may indicated by the score 0.

Next, the feature based matching score may be obtained by matching one or more features associated with the image components of the test image against the one or more features associated with the image components in the image template. In one example, the feature based matching score ($d_{feature}(t; T_i)$) is determined as the Euclidian distance between the test component and each of the $i^{th}$ component from the template component set. Further, the distance of the test component with each component in the template set is obtained as the product of these two metric by the equation given below:

$$d_{t,\tau_i}=d_{loc}(t,\tau_i)\cdot d_{feature}(t,\tau_i) \quad (4)$$

In one example, the image matching apparatus 102 determines if degree of matching between at least one of the position based matching score, the feature based matching score or a combination thereof exceeds a predetermined threshold degree. For example, where the test component is the $i^{th}$ component, $d_t;T_i<d_tT_j$, $\forall j\in$template–set and $j\neq i$ and if $d_{tiTi}<Th_{dist}$ where $Th_{dist}$ is the predetermined threshold, the image components of the test image and those of the image template are considered as non matching.

In an exemplary embodiment, the matching degree is determined optimally as a function of both the position based matching score and the feature based matching score.

In one implementation, the data related to the matching module 216 may be stored in a matching database 224. In one example, the matching database may include but not limited to a matching score value, a position based matching score value, a feature based matching score value and the like.

Figure 6:
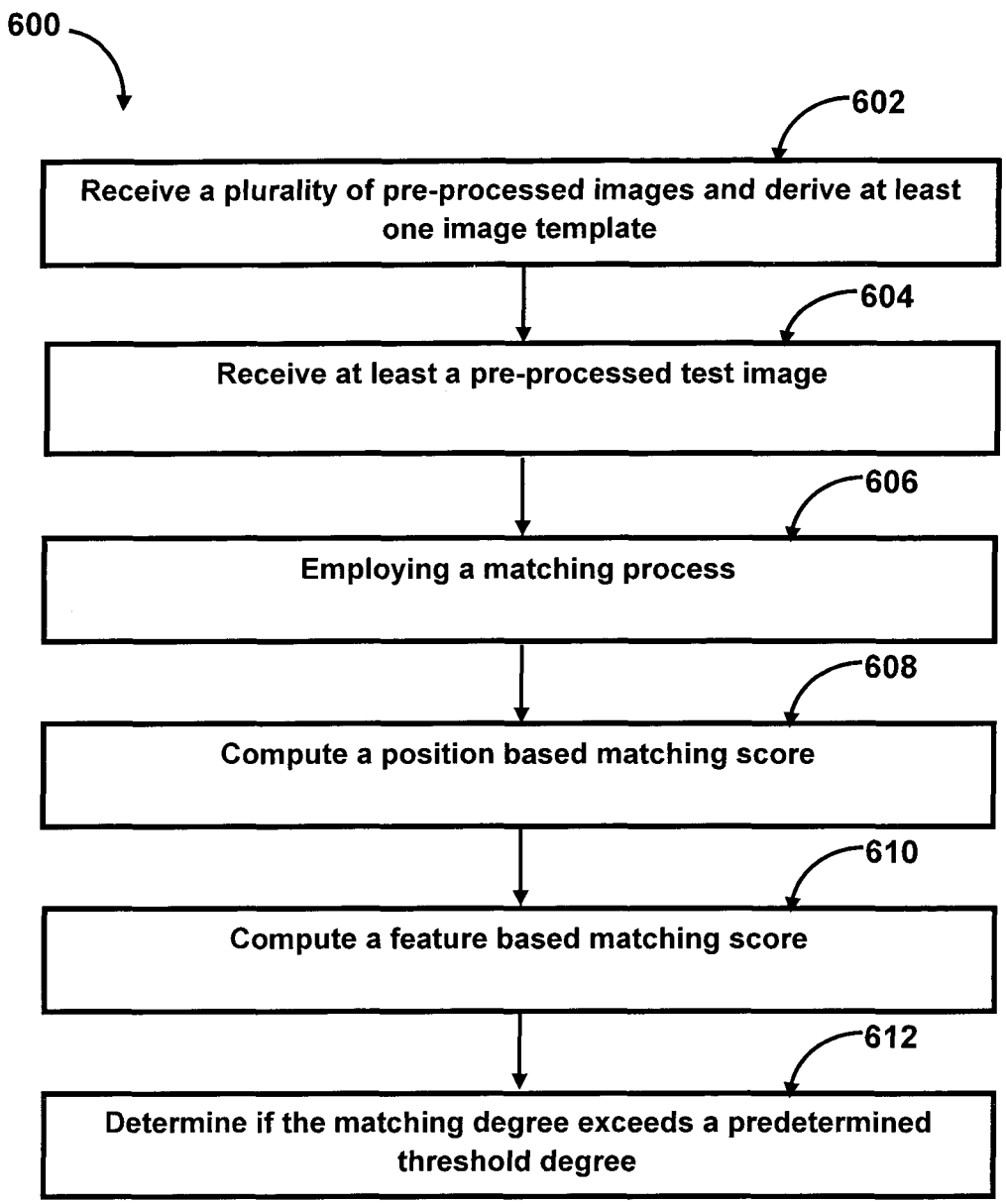
FIG. 6 illustrates an image matching method, in accordance with an embodiment of the present subject matter.

Referring now to FIG. 6, a method 600 for image matching method is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described image matching apparatus 102.

At block 602, plurality of pre-processed images is received for deriving at least one image template therefrom.

At block 604, at least a pre-processed test image is received from the capturing device 104. In one implementation, the said pre-processed test image comprises of one or more image components along with one or more features associated with the image components.

Figure 7:
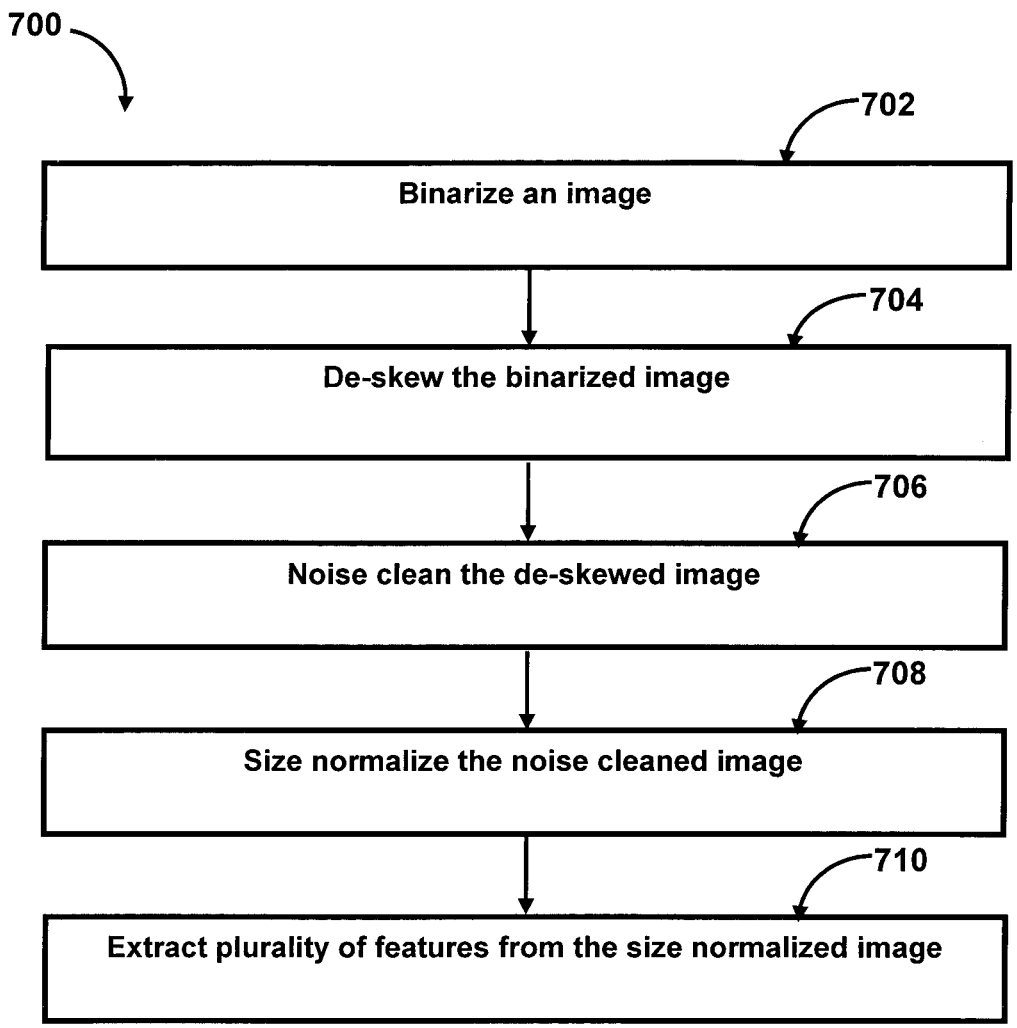
FIG. 7 illustrates a pre-processing method, in accordance with an embodiment of the present subject matter.

The pre-processed images and the pre-processed test image is obtained by pre-processing method as explained in greater detail in FIG. 7.

At block 606, a matching process to determine a matching degree between the test image component and the image components of the plurality of pre-processed images of the image template is employed.

At block 608, a position based matching score is computed. The method for obtaining the position based matching score is explained in greater detail in FIG. 8.

At block 610, a feature based matching score is computed. In one implementation, the feature based matching score is obtained by matching the one or more features associated with the image components of the test image against the one or more features associated with the image components in the image template.

At the block 612, the matching degree is compared against the pre-determined threshold degree.

Referring now to FIG. 7, a pre-processing method 700 for blocks 602 and 604, in accordance with an embodiment of the present subject matter, is presented. In one implementation, the plurality of pre-processed images and the pre-processed test image are pre-processed before being transmitted to the backend server.

At block 702, the received image is binarized using either of Otsu's method, Savoula method, Niblack method and Wolf Binarization Techniques and the like, and preferably Otsu's method.

At block 704, the binarized image is de-skewed. In one implementation, de-skewing the binarized image is performed by Hough transform method. However the disclosed subject matter shall be understood to include other methods of image de-skewing that may be well known to the person skilled in the art.

At block 706, the de-skewed image is then noise cleaned. In one implementation, the noise cleaning the de-skewed image to remove small characters, thus extracting only significant components is performed by any of the existing feature extraction techniques known in the art.

At block 708, the noise cleaned image is then size normalized. In one implementation, the size normalizing the noise cleaned image is performed by any of the existing feature extraction techniques known in the art. In one example size normalizing the noise cleaned image is performed so that the characters are made independent of size and camera zoom.

At block 710, the plurality of features from the size normalized image is extracted. In one implementation, the plurality of features from the size normalized image is extracted using any of the existing feature extraction techniques known in the art. The plurality of features extracted may include but not limited to a vertical projection, a horizontal projection, where the number of black pixels in each direction are extracted, and stroke features are extracted, which gives the direction of the stroke.

Figure 8:
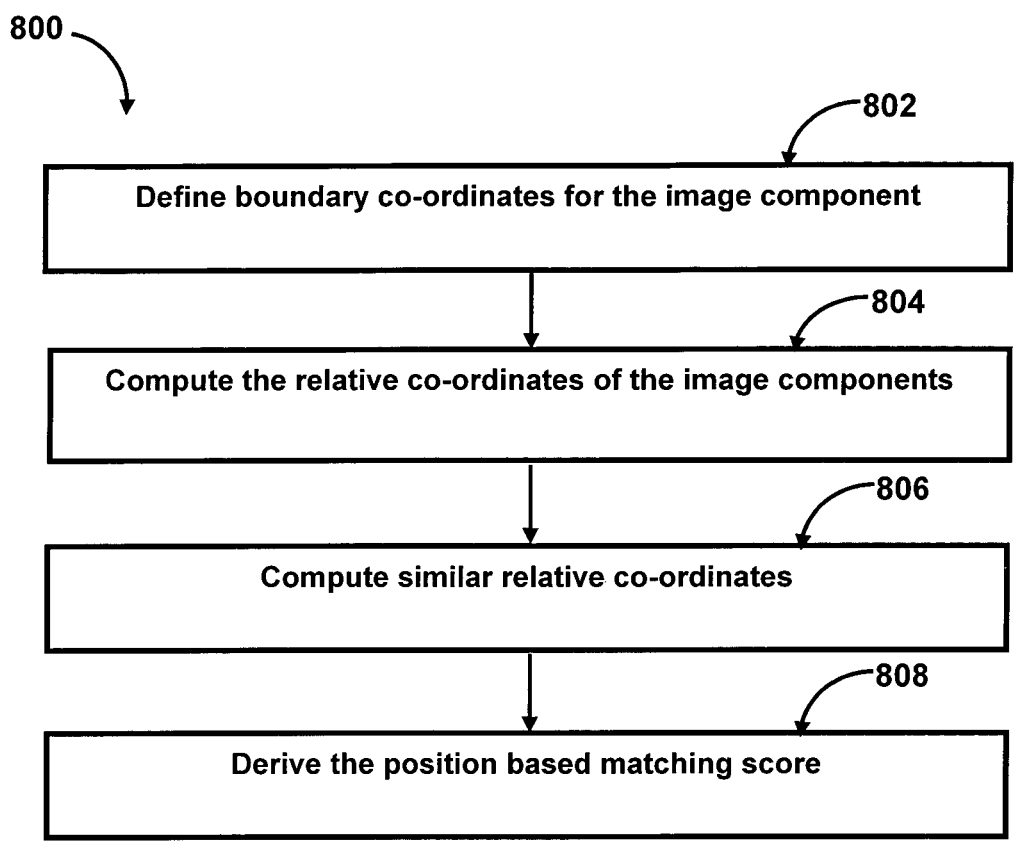
FIG. 8 illustrates a method for deriving a position based matching score, in accordance with an embodiment of the present subject matter.

Referring now to FIG. 8, a method 800 for deriving a position based matching score for 608, in accordance with an embodiment of the present subject matter is shown.

At block 802, the boundary co-ordinates for the image component are defined. In one implementation, the boundary co-ordinates of the image component associated with the pre-processed test image and the plurality of pre-processed images of the image template are defined.

At block 804, the relative co-ordinates of the image components are computed. In one implementation, the relative co-ordinates of the image components associated with the pre-processed test image and the plurality of pre-processed images of, the image template are computed.

At block 806, similar relative co-ordinates are computed. In one implementation, the similar relative co-ordinates to make the image components resolution independent are computed.

At block 808, position based matching score is derived. In one implementation, the position based matching score based on matching of the similar relative coordinates of the image components associated with the first pre-processed image and the plurality of pre-processed images of the image template is derived. In an exemplary embodiment, the matching degree is determined optimally as a function of both the position based matching score and the feature based matching score.

Figure 9:
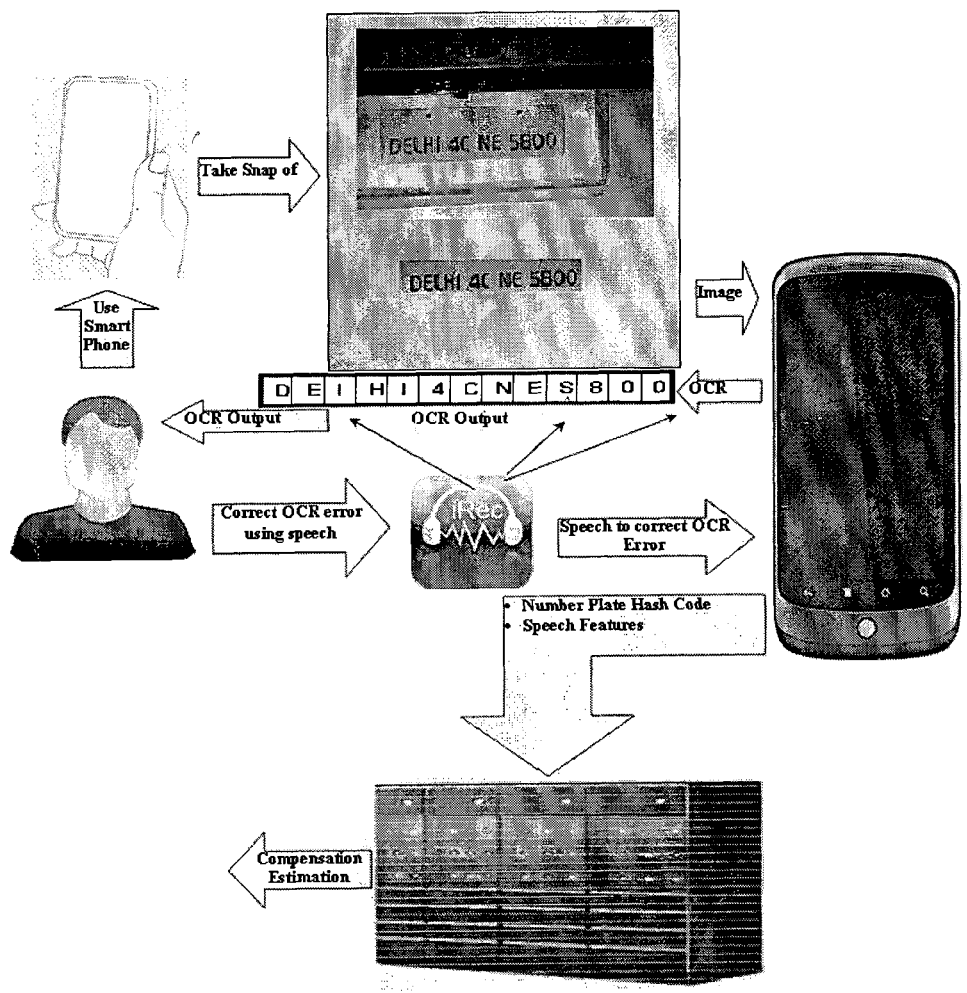
FIG. 9 illustrates an exemplary image matching apparatus, in accordance with an embodiment of the present subject matter.

Referring now to FIG. 9 an exemplary image matching apparatus, in accordance with an embodiment of the present subject matter is illustrated. The image matching apparatus is shown to be implemented for a vehicle number plate recognition apparatus.

In one example, a user may capture an image of a vehicle number plate using a capturing module 402 of a capturing device 104. The image captured is pre-processed using a pre-processing module 404 of the capturing device 104. The features extracted during the pre-processing are transmitted to a memory 206.

The memory 206 present inside an image matching apparatus 102 receives the transmitted features extracted during the pre-processing using a receiving module 212. The receiving module is further configured to receive the plurality of pre-processed image of vehicle number plate. The vehicle number plate's images may be obtained from the car agencies or the car vendor. The vehicle number plate images are then pre-processed for further processing.

The receiving module further transfers the pre-processed vehicle number plate images to a template creation module 214. The template creation module 214 creates the image template that includes the plurality of pre-processed vehicle number plate images, the vehicle number plate image components along with one or more features associated with the vehicle number plate image components.

A matching module 216 is further adapted to match the features present inside the image template and the transmitted features extracted during the pre-processing of the captured image.

Based on a matching process of the template a report comprising of the vehicular information is generated.

Figure 10:
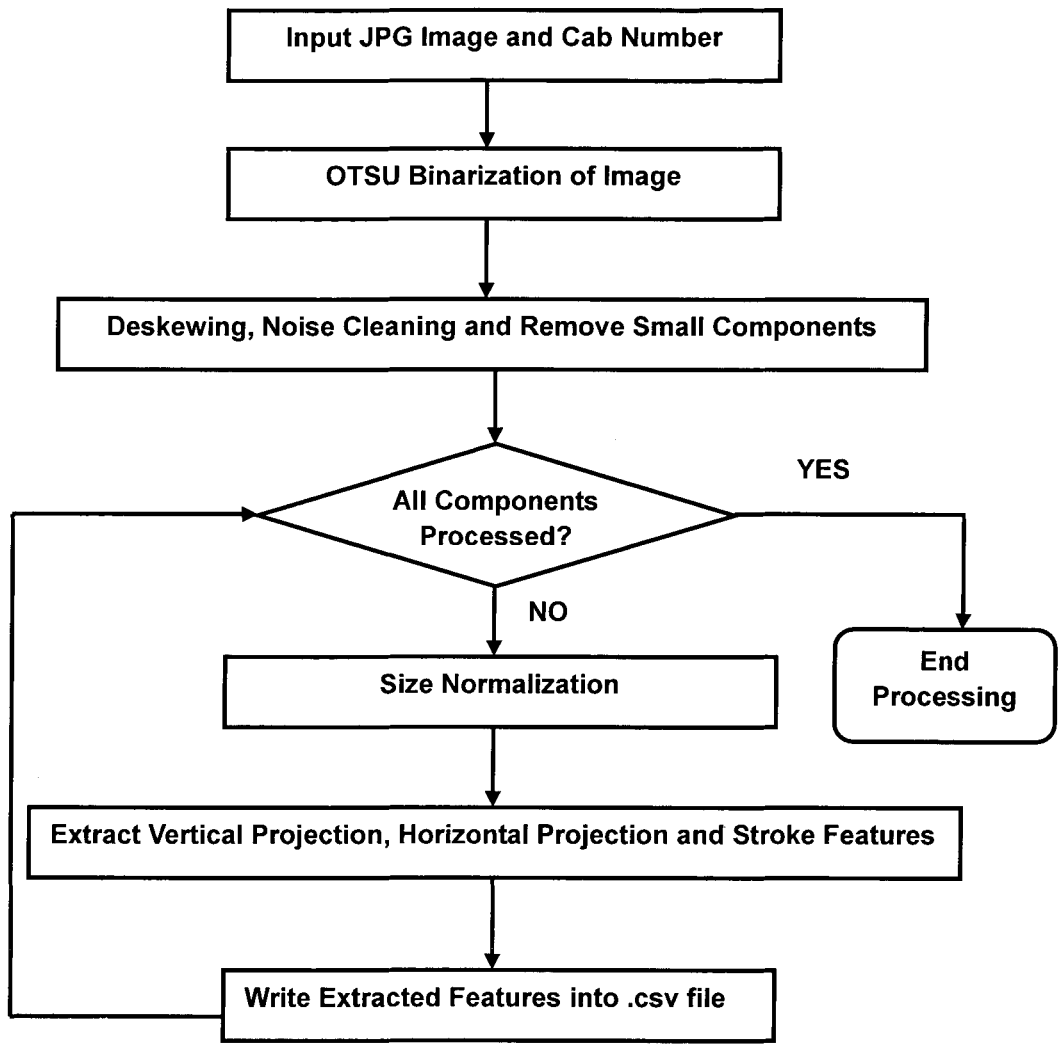
FIG. 10 illustrates an exemplary template creation flowchart, in accordance with an embodiment of the present subject matter.

Referring now to FIG. 10 is an exemplary template creation flowchart, in accordance with an embodiment of the present subject matter is illustrated. In one example, the apparatus is implemented for vehicle number plate matching apparatus.

A plurality of vehicle number plate image is received from the car rent agency. The received image is now binarized using either of the Otsu's, Sauvola, Niblack or Wolf method. The binarized image is then analyzed using run connected component analysis. A threshold-based approach is now applied to remove small components as noises. The noise-cleaned image is then De-skewed. In one example, Hough transform method may be used to estimate the skew. Further, the plurality of features are extracted from the de-skewed image. The features extracted may include Vertical Projection (F1), Horizontal Projection (F2), Contour (F3), and Stroke direction (F4).

In one example, the vehicle number plate details along with the features are stored in-the template. The details may be stored in a .XML file format as given below.

```
<Number of car in Database>
<Car Descriptor>
<Driver's Phone Number>
<Car Number>
<Number of text lines>
</Number of text lines>
<Component Number> 448
Dimensional feature vector
</Component Number>
</Car Descriptor>
```

Figure 11:
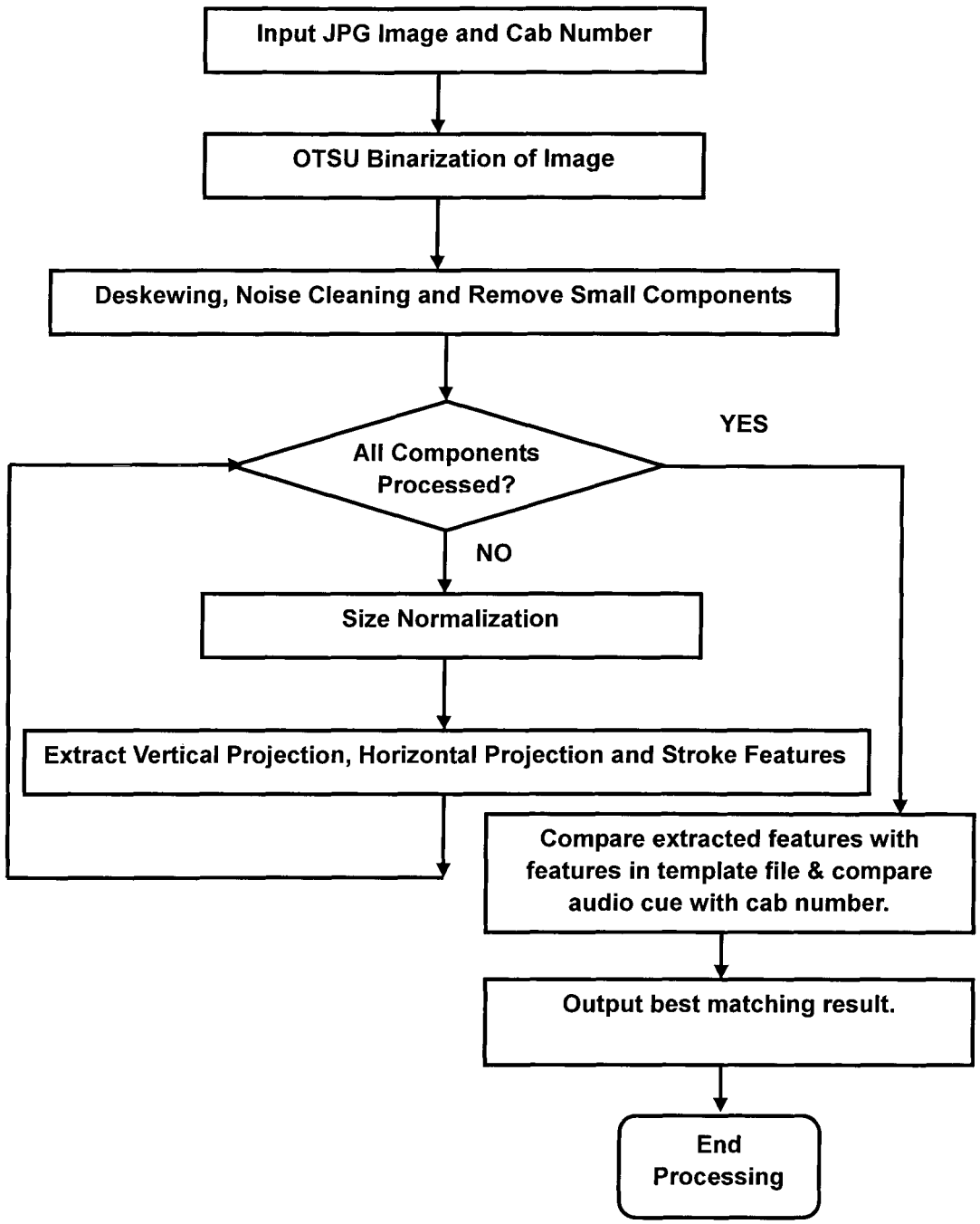
FIG. 11 illustrates an exemplary feature extraction and template-matching flowchart, in accordance with an embodiment of the present subject matter.

FIG. 11 illustrates an exemplary Feature Extraction and template matching flowchart, in accordance with an embodiment of the present subject matter. In one example the apparatus is implemented for vehicle number plate matching apparatus.

The images may be captured by the security person using a capturing device. These images may then need to undergo some image processing before being transmitted to the back end. The flow chart of the method is shown in FIG. 11. Security person captures the image and may localize the text region in the smart phone. The image captured is binarized using preferably the Otsu's method. Further the image undergoes the steps like: correcting the skew using Hough transformation, running connected component analysis on the skew corrected image. Further, removing small and large components, applying line segmentation, and normalizing each component. In one example, each component is normalized to 48×48. Finally, the features F1, F2, F3, and F4 are extracted by the captured image and send to the back end. Then, the features extracted from the captured image are compared with the features present in the image template.

Figure 12:
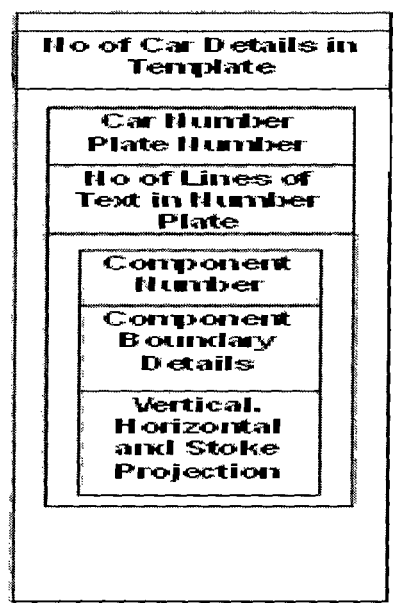
FIG. 12 illustrates an exemplary image template created in accordance with an embodiment of the present subject matter.

Referring now to FIG. 12 an exemplary template structure, created in accordance with an embodiment of the present subject matter is presented. In one example the apparatus is implemented for vehicle number plate matching apparatus.

In one example, the template structure created may include a vehicle car number plate image, a number of lines of text in the vehicle car number plate image, a component number extracted from the vehicle car number plate image, and a plurality of feature details. Such feature details include but not limited to component boundary details, vertical projection, horizontal projection, contour and a stroke direction. The number of lines of text, the component number and the plurality of features may be extracted from the vehicle car number plate image during the pre-processing of the vehicle car number plate image.

Figure 13:
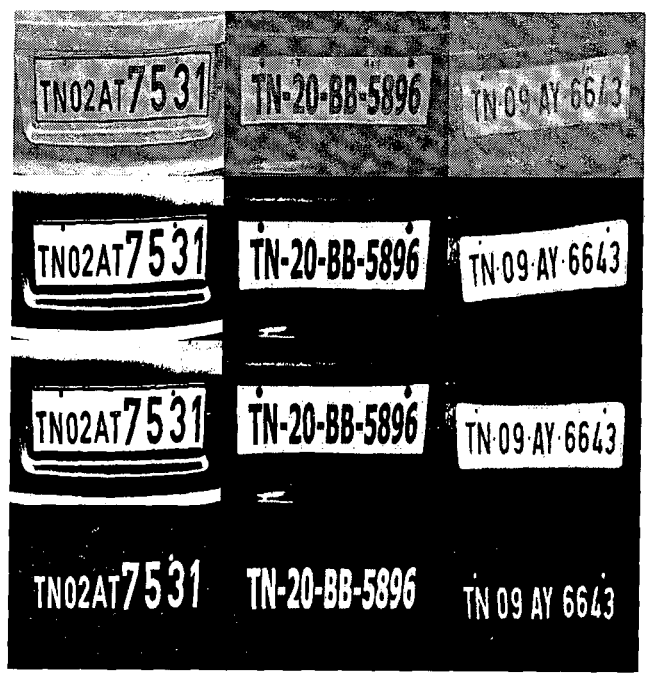
FIG. 13 illustrates an exemplary pre-processed image, in accordance with an embodiment of the present subject matter.

Referring now to FIG. 13 an exemplary pre-processed image, in accordance with an embodiment of the present subject matter is illustrated. In one example the apparatus is implemented for vehicle number plate matching apparatus.

In one example the steps for pre-processed image is given in the FIG. 13, Row 1: Original Image; Row 2: Result after Otsu Binarization; Row 3: Result after Deskewing; Row 4: Result after Noise cleaning and removing small components.

The principal advantage of invention described above is that it is able to operate in any location and at any time, and is extremely simple and safe to operate since it uses well known devices like mobile phones with camera for capturing the image.

The other advantage of invention is that it is able to work efficiently even though there is a variation in the painting style of a number plate with all possible fonts/painting style of the characters as there are no standard fonts and size of the number plates.

The other advantage of invention is that it is able to recognize the number plate image efficiently without any concern of the different style of painting agents/agencies who write the numbers on the plates with different and unique styles.

The other advantage of invention is that there may not be a continuous need for the application to require the Internet Connection, if it is installed on the image-capturing device itself.

The other advantage of invention is that it is able to efficiently capture the image and recognize it even though there is a presence of specular reflection in the images captured in the night, where the images obtained are often blurred and have low contrast and text localization against the background of the image captured.

The other advantage of invention is that the time consumption in the traditional number plate recognition systems is greatly reduced due to the automated process mentioned above.

Although implementations for methods and apparatus for image matching apparatus for computation and processing of an image for image matching have been described in language specific to structural features and/or methods, it is to be understood that the appended claims are not necessarily limited to the specific features or methods or advantages described. Rather, the specific features and methods are disclosed as examples of implementations for image matching apparatus and method.

We claim:

1. A method for image matching, comprising:
   receiving, via one or more hardware processors, plurality of pre-processed images and deriving at least one image template therefrom;
   receiving, via the one or more hardware processors at least a pre-processed test image, said pre-processed test image comprising one or more image components and one or more features associated with the image components; and
   employing, via the one or more hardware processors a matching process to determine a matching degree between the test image component and the image components of the plurality of pre-processed images of the image template, the matching process comprises:
   computing a position based matching score by matching relative coordinates and similar relative coordinates of the image components associated with the first pre-processed image and the plurality of pre-processed images of the image template; wherein the similar relative co-ordinates computing makes the image components resolution independent;
   computing a feature based matching score; and
   determining if at least one of the matching degree from the position based matching score and the feature based matching score exceeds a predetermined threshold degree.

2. The method of claim 1, wherein the image template comprises the plurality of pre-processed images, the image components and one or more features associated with the image components.

3. The method of claim 1, wherein the plurality of pre-processed images and the pre-processed test image are pre-processed in steps of:

binarizing an image;
de-skewing the binarized image;
noise cleaning the de-skewed image;
size normalizing the noise cleaned image; and
extracting plurality of features from the size normalized image.

4. The method of claim 2, wherein the extraction of plurality of features comprises extracting vertical projection, horizontal projection, contour and a stroke direction from the image.

5. The method of claim 1, wherein the matching process further comprises
   defining boundary co-ordinates of the image component associated with the pre-processed test image and the plurality of pre-processed images of the image template;
   computing the relative co-ordinates of the image components associated with the pre-processed test image and the plurality of pre-processed images of the image template, based on the defined boundary co-ordinates; and
   computing the similar relative co-ordinates of the computed relative co-ordinates.

6. The method of claim 1, wherein the feature based matching score is obtained by matching the one or more features associated with the image components of the test image against the one or more features associated with the image components in the image template.

7. An image matching apparatus, the apparatus comprising:
   a processor;
   at least one memory, the at least one memory coupled to the at least one processor, wherein the at least one processor is capable of executing programmed instructions stored in the at least one memory to:
   receive at least one pre-processed test image, said pre-processed test image comprising one or more test image components and one or more features associated with the image components and a plurality of pre-processed images for creating an image template;
   create at least one image template from the plurality of pre-processed images; and
   compute a position based matching score by matching relative coordinates and similar relative coordinates of the image components associated with the first pre-processed image and the plurality of pre-processed images of the image template; wherein the similar relative co-ordinates computing makes the image components resolution independent;
   a feature based matching score or a combination thereof, test image component and the image components of the plurality of pre-processed images of the image template.

8. The image matching apparatus of claim 7, wherein the at least one processor is further capable of executing programmed instructions stored in the at least one memory to:
   capture one or more image;
   extract one or more image components and one or more features associated with the image components; and
   transmit one or more image components along with one or more features associated with the image components, to the at least one memory.

9. The image matching apparatus of claim 7, wherein the pre-processed image is obtained in steps of:
   binarizing the image;
   de-skewing the binarized image;

noise cleaning the de-skewed image;
size normalizing the noise cleaned image; and
extracting the plurality of features from the size normalized image.

10. The image matching apparatus of claim 7, wherein the image template comprises the plurality of pre-processed images, the image components thereof along with one or more features associated with the image components.

11. The image matching apparatus of claim 7, wherein the at least one processor is further capable of executing programmed instructions stored in the at least one memory to
define boundary co-ordinates of the image component associated with the pre-processed test image and the plurality of pre-processed images of the image template;
compute the relative co-ordinates of the image components associated with the pre-processed test image and the plurality of pre-processed images of the image template;
compute the similar relative co-ordinates to make the image components resolution independent; and.

12. The image matching apparatus of claim 7, wherein the matching module is configured to compute the feature based matching score by matching the one or more features associated with the image components of the test image against the one or more features associated with the image components in the image template.

13. A non-transitory computer-readable medium having embodied thereon a computer program for executing a method for image matching, the method comprising:

receiving, via one or more hardware processors, a plurality of pre-processed images and deriving at least one image template therefrom;

receiving, via the one or more hardware processors, at least a pre-processed test image, said pre-processed test image comprising one or more image components and the one or more features associated with the image components; and employing, via the one or more hardware processors a matching process to determine a matching degree between the test image component and the image components of the plurality of pre-processed images of the image template, the matching process comprising steps of:

computing a position based matching score by matching relative coordinates and similar relative coordinates of the image components associated with the first pre-processed image and the plurality of pre-processed images of the image template; wherein the similar relative co-ordinates computing makes the image components resolution independent;

computing a feature based matching score; and determining if at least one of the matching degree determined from at least one of the position based matching score, the feature based matching score or a combination thereof, exceeds a predetermined threshold degree.

* * * * *